United States Patent
Beisswenger

[11] Patent Number: 6,012,738
[45] Date of Patent: Jan. 11, 2000

[54] VEHICLE OCCUPANT RESTRAINT SYSTEM

[75] Inventor: Roland Beisswenger, Schwäbisch Gmünd, Germany

[73] Assignee: TRW Occupant Restraint Systems GmbH, Alfdorf, Germany

[21] Appl. No.: 09/026,979

[22] Filed: Feb. 20, 1998

[30] Foreign Application Priority Data

Feb. 25, 1997 [DE] Germany ............... 297 03 360 U

[51] Int. Cl.⁷ ................................................. B60R 21/16
[52] U.S. Cl. ................................. 280/743.1; 280/741
[58] Field of Search ........................... 280/743.1, 741, 280/736

[56] References Cited

U.S. PATENT DOCUMENTS 3,853,334 12/1974 Auman et al. .
3,868,126 2/1975 Radke et al. .
5,524,926 6/1996 Hirai et al. .......................... 280/743.1
5,584,507 12/1996 Khandhadia et al. ............... 280/743.1
5,700,532 12/1997 Chiou ................................ 280/743.1
5,904,369 5/1999 Swann et al. ....................... 280/743.1

FOREIGN PATENT DOCUMENTS 9315907 8/1993 WIPO .

*Primary Examiner*—Kenneth R. Rice
*Attorney, Agent, or Firm*—Tarolli, Sundheim, Covell, Tummino & Szabo L.L.P.

[57] ABSTRACT

A vehicle occupant restraint system comprises a gas bag and a gas generator for filling the gas bag. To seal the gas bag dynamically during the insufflation process and to substantially increase the pressure keeping duration of the gas bag, compressed gases which are produced by the gas generator are provided with a sealing compound. The sealing compound is distributed on the inner side of the bas bag during the insufflation process thereof.

10 Claims, 2 Drawing Sheets

VEHICLE OCCUPANT RESTRAINT SYSTEM

The invention relates to a vehicle occupant restraint system with a gas bag and a gas generator for filling the gas bag.

BACKGROUND OF THE INVENTION

Such vehicle occupant restraint systems are known and for several years have been incorporated into standard vehicles to an increasing extent. Sensors here detect extraordinary driving situation, such as, for example, an impact or an impending overturn, and cause the activation of the gas generator, which thereupon inflates the gas bag. The inflation time and pressure keeping duration of the gas bag must be measured so that the gas bag is completely filled on impact of the vehicle occupant. In the case of a frontal impact, a pressure keeping duration in the region of 100 ms is generally sufficient. In the case of an overturn, however, the pressure keeping duration should lie in the region of a few seconds, because an overturn can last several seconds up to the vehicle being at a standstill. To extend the pressure keeping duration of a gas bag into the region of seconds, coated fabric with a low gas-permeability is used for the production of the gas bag. The use of a gas bag woven in one piece likewise extends the pressure keeping duration. Whilst the production of a gas bag woven in one piece entails, among other things, high manufacturing costs, with the use of coated fabric over the lifespan of the vehicle the danger exists that the coated fabric sticks together in folded state.

SUMMARY OF THE INVENTION

By means of the invention, the gas bag is to be sealed dynamically during the inflation process, and the pressure keeping duration of the gas bag is to be substantially increased, without having to also accept the disadvantages occurring in the prior art.

These advantages are achieved with a vehicle occupant restraint system with a gas bag and a gas generator for filling the gas bag, wherein the compressed gases which are produced by the gas generator are provided with a sealing compound. The sealing compound is distributed on the inner side of the gas bag during the insufflation process thereof. The dynamic sealing of the gas bag only during the inflation process make it possible to use uncoated gas bag material, such as, for example, an uncoated fabric. Hereby, in the folded state, a smaller space requirement is necessary than in already coated material. Problems occurring in the prior art with coated gas bag material as regards the sticking of the gas bag material in the folded state are reliably avoided by the invention. The manufacturing process of the gas bag is as a whole less critical, because care does not have to be taken regarding damage to a coating or to a particularly gas-tight embodiment of seams. The sealing compound can be integrated in the gas container of a hybrid gas generator.

According to a further development of the invention, the vehicle occupant restraint system additionally has a storage vessel containing a sealing compound. The storage vessel is able to be acted upon by compressed gases which are produced by the gas generator. An outlet opening of the storage vessel is in flow connection with the gas bag, so that the sealing compound during the inflation process of the gas bag is conveyed from the storage vessel to the gas bag and is distributed on its inner side. The sealing compound can be present in the sealing compound storage in fluid or pulverized state.

In a further development of the invention, the storage vessel is arranged in a connection line between the gas generator and the gas bag. Such an arrangement is adaptable particularly easily to cramped installation conditions through the spatial separation of gas generator, storage vessel and gas bag.

According to another embodiment of the invention, the storage vessel is arranged in the gas bag. Short distances from the storage vessel to the gas bag only require a small structural expenditure and avoid line losses in the conveying of the sealing compound.

In an advantageous further development of the invention, at an orifice opening into the gas bag, at which the sealing compound, conveyed from the storage vessel to the gas bag, enters in the gas bag, a distributor nozzle is provided having several outflow openings. A distributor nozzle makes possible a uniform distribution of the sealing compound on the inner side of the gas bag, so that for the sealing of the gas bag less sealing compound is necessary than with irregular distribution.

In another preferred embodiment of the invention, the gas generator and storage vessel are integrated in a common housing. Such a compact type of construction of the vehicle occupant restraint system saves manufacturing costs and reduces losses in the conveying of compressed gas and sealing compound. The propellent charge of the gas generator and the storage vessel can therefore be of small dimensions.

Preferably, a bursting diaphragm is arranged in the path of the compressed gases produced by the gas generator and acting upon the storage vessel, between the gas generator and the storage vessel. This makes it possible to close off the storage vessel with respect to the gas bag, without impairing the function of the vehicle occupant restraint system in the case of a vehicle impact. Over the lifespan of the vehicle, therefore, alterations to the propellent charge and sealing compound by reciprocal contact can be ruled out. The use of a bursting diaphragm is advantageous particularly with the use of fluid sealing compound.

It is likewise advantageous to interrupt the flow connection from the storage vessel to the gas bag in the state of rest by a bursting diaphragm. A direct contact of sealing compound and gas bag material and changes in sealing compound or gas bag material resulting therefrom can therefore be avoided.

In order to avoid a direct contact between the propellent charge and the sealing compound in the state of rest, it can also be advantageous to arrange a separating wall, provided with a valve, in the path of the compressed gases produced by the gas generator and acting upon the storage vessel, between the gas generator and the storage vessel.

Finally, it can likewise be advantageous to also arrange a separating wall, provided with a valve, in the flow connection from the storage vessel to the gas bag.

BRIEF DESCRIPTION OF THE DRAWINGS

Preferred embodiments of the invention are illustrated in the drawing and are described hereinbelow, in which the same components of the different embodiments are designated by the same reference numbers. Herein.

DESCRIPTION OF THE PREFERRED EMBODIMENTS

Figure 1:
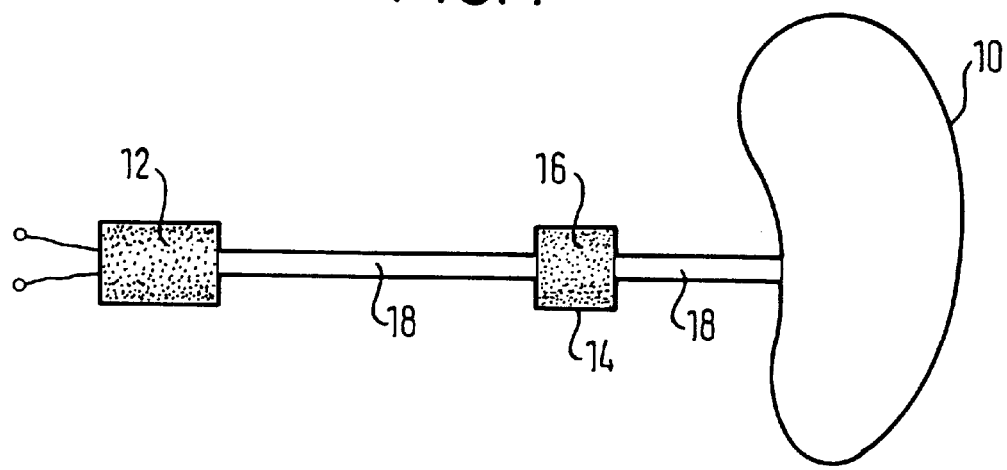
FIG. 1 shows a diagrammatic representation of a first embodiment of the vehicle occupant restraint system according to the invention.

FIG. 1 shows a vehicle occupant restraint system according to the invention, in which a gas generator 12, after its activation, fills a gas bag 10. For a clearer illustration, the gas bag 10 is illustrated in inflated state. A storage vessel 14 is arranged in a connecting line 18 between gas generator 12 and gas bag 10 which contains sealing compound 16. A flow connection exists via the connecting line 18, between an outlet opening of the storage vessel 14 and the gas bag 10. On activation of the gas generator 12, compressed gases produced by its propellent charge act upon the storage vessel 14 and the sealing compound 16 contained therein. The sealing compound 16 is entrained by the compressed gases and conveyed from the outlet opening of the storage vessel 14 through the connecting line 18 to the gas bag 10. The pulverized sealing compound 16 enters, mixed with the compressed gases, into the gas bag 10, which is in folded state before activation of the gas generator 12.

During the unfolding process, compressed gas mixed with sealing compound 16 arrives at the inner side of the gas bag 10, in which the sealing compound 16, entrained by the compressed gas, is deposited at least partially hereon and seals the gas bag material. A coating and sealing of the entire inner side of the gas bag 10 is also ensured in that compressed gas escaping into the atmosphere through any possible uncoated sections of the gas bag material is mixed with sealing compound 16. Due to the flowing out of compressed gas mixed with sealing compound 16 through still uncoated sections of the gas bag material, sealing compound 16 is deposited also on these sections so that a self-sealing function of the gas bag exists.

Figure 2:
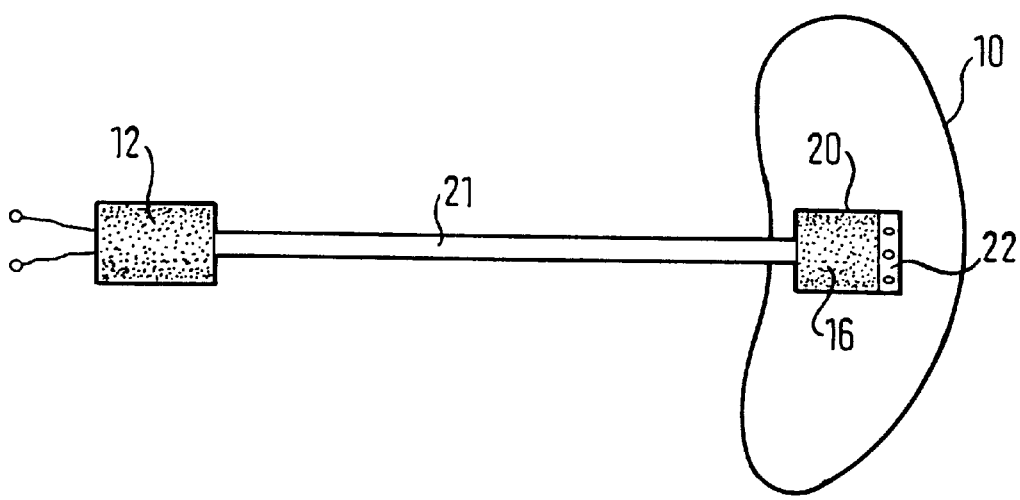
FIG. 2 shows a diagrammatic representation of a second embodiment of the vehicle occupant restraint system according to the invention.

In the embodiment of the invention illustrated in FIG. 2, a storage vessel 20 is arranged in the gas bag 10 itself. The outlet opening of the storage vessel 20 is in flow connection with the gas bag 10 via a distributor nozzle 22. On activation of the gas generator 12, the storage vessel 20 is acted upon by compressed gas via the connecting line 21, and the sealing compound 16 contained in the storage vessel 20 is conveyed into the distributor nozzle 22 and is distributed through this, according to the position of its outlet openings, during the unfolding process of the gas bag 10 on its inner side. By a corresponding arrangement of the outflow openings of the distributor nozzle 22, a uniform distribution of the sealing compound 16 on the inner side of the gas bag 10 can be achieved, which is particularly advantageous when the gas bag 10, as illustrated in FIG. 2, has a pronounced cushion shape.

Figure 3:
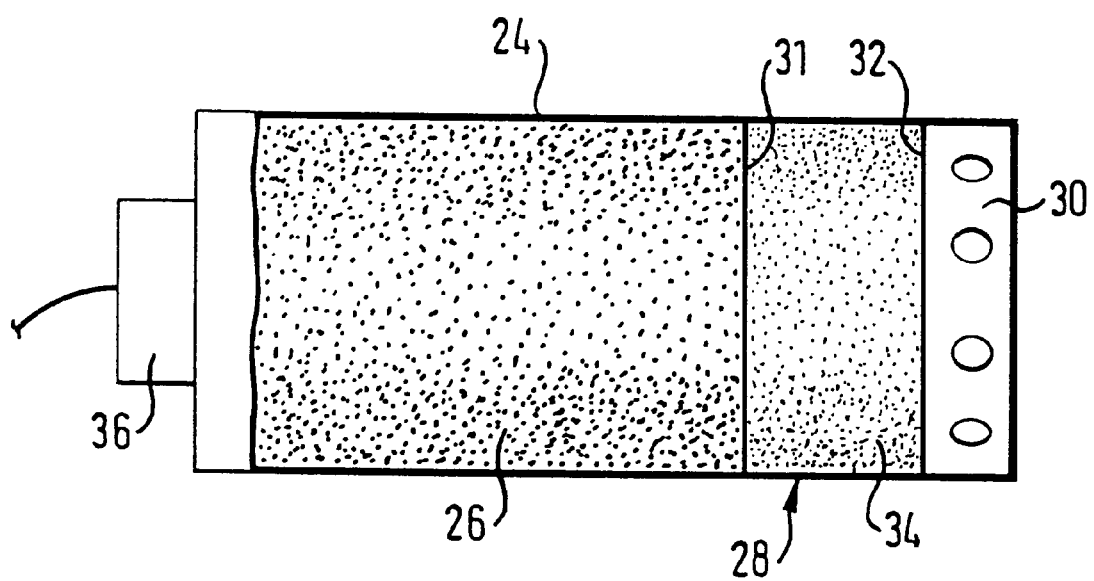
FIG. 3 shows a diagrammatic sectional view of a third embodiment of the invention.

FIG. 3 shows a third embodiment of the vehicle occupant restraint system according to the invention, in which for greater clarity, an illustration of the gas bag has been dispensed with. In order to achieve a compact type of construction, here a gas generator 26 and a storage vessel 28 were integrated in a common housing 24. A distributor nozzle 30, provided with several outflow openings, is likewise integrated in the housing 24. The sealing compound 34, contained in the storage vessel 28, in this embodiment is present in fluid state. In order to avoid a running out of the sealing compound 34 into the distributor nozzle 30 and a contact of the sealing compound 34 with the propellent charge of the gas generator 26, the storage vessel 28 is closed towards the gas generator 26 by a bursting diaphragm 31 and towards the distributor nozzle 30 by a bursting diaphragm 32. To activate the gas generator 26, its propellent charge is ignited by means of an electric igniter 36. The compressed gases produced thereby firstly act upon the bursting diaphragm 31 and after this has been burst by the rising pressure within the gas generator 26, act upon the sealing compound 34 directly. Subsequently, also the second bursting diaphragm 32, which separates the storage vessel 28 from the distributor nozzle 30, will burst, whereupon the sealing compound 34 enters into the distributor nozzle 30. As compressed gases continue to be produced by the gas generator 26, the sealing compound 34 flows together with the compressed gases produced from the gas generator 26 through the outflow openings of the distributor nozzle 30 into the gas bag. During the unfolding of the gas bag, the sealing compound 34 is then distributed on the inner side of the gas bag and seals this off.

I claim:

1. A vehicle occupant restraint system comprising:

a gas bag, a gas generator producing compressed gases for filling said gas bag, a sealing compound and means for providing said compressed gases with said sealing compound, said sealing compound being distributed on an inner side of said gas bag during an insufflation process thereof.

2. The vehicle occupant restraint system according to claim 1, wherein said means for providing said compressed gases with said sealing compound are provided with a storage vessel with an outflow opening containing said sealing compound, said storage vessel being able to be acted upon by said compressed gases produced by said gas generator and said outflow opening of said storage vessel being in flow connection with said gas bag, so that said sealing compound is conveyed from said storage vessel to said gas bag during said insufflation process of said gas bag and is distributed on its inner side.

3. The vehicle occupant restraint system according to claim 2, further comprising a connecting line between said gas generator and said gas bag, said storage vessel being arranged in said connecting line between said gas generator and said gas bag.

4. The vehicle occupant restraint system according to claim 2, wherein said storage vessel is arranged within said gas bag.

5. The vehicle occupant restraint system according to claim 2, wherein a distributor nozzle, provided with several outflow openings, is provided at an orifice opening into said gas bag, at which said sealing compound, conveyed from said storage vessel to said gas bag, enters into said gas bag.

6. The vehicle occupant restraint system according to claim 2, wherein said gas generator and said storage vessel are integrated in a common housing.

7. The vehicle occupant restraint system according to claim 2, wherein a bursting diaphragm is arranged in the path of said compressed gases produced by said gas generator and acting upon said storage vessel, between said gas generator and said storage vessel.

8. The vehicle occupant restraint system according to claim 2 wherein said flow connection from said storage vessel to said gas bag in the inactive state is interrupted by a bursting diaphragm.

9. The vehicle occupant restraint system according to claim 2, wherein a dividing wall, provided with a valve, is arranged in the path of said compressed gases produced by said gas generator and acting upon said storage vessel, between said gas generator and said storage vessel.

10. The vehicle occupant restraint system according to claim 2, wherein a dividing wall, provided with a valve, is arranged in said flow connection from said storage vessel to said gas bag.

* * * * *